United States Patent
Bitz

(10) Patent No.: US 7,806,486 B2
(45) Date of Patent: Oct. 5, 2010

(54) BRAKING SYSTEM WITH EBS AND PREFILL FUNCTION AND ELECTRONIC BRAKING CONTROL METHOD

(75) Inventor: Gerd Bitz, Mainz (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/613,762

(22) Filed: Dec. 20, 2006

(65) Prior Publication Data

US 2007/0114838 A1 May 24, 2007

Related U.S. Application Data

(63) Continuation of application No. PCT/EP2005/006778, filed on Jun. 23, 2005.

(30) Foreign Application Priority Data

Jun. 24, 2004 (DE) ........................ 10 2004 030 464

(51) Int. Cl.
*B60T 13/66* (2006.01)
(52) U.S. Cl. ........................................ 303/20; 303/191
(58) Field of Classification Search .................. 303/20, 303/191, 193, 198, 154, 155, 156, 157, 158
See application file for complete search history.

(56) References Cited

U.S. PATENT DOCUMENTS

| | | | | |
|---|---|---|---|---|
| 3,726,369 A | * | 4/1973 | Esteves | 477/184 |
| 4,146,108 A | * | 3/1979 | Sato | 188/163 |
| 6,033,035 A | * | 3/2000 | Neumann et al. | 303/155 |
| 6,074,020 A | * | 6/2000 | Takahashi et al. | 303/154 |
| 6,219,610 B1 | * | 4/2001 | Araki | 303/140 |
| 6,234,585 B1 | * | 5/2001 | Harris et al. | 303/20 |
| 6,474,753 B1 | * | 11/2002 | Rieth et al. | 303/191 |
| 6,932,441 B2 | * | 8/2005 | Hellmann et al. | 303/177 |
| 7,018,004 B2 | * | 3/2006 | Chen et al. | 303/193 |
| 7,052,094 B2 | * | 5/2006 | Ganzel | 303/116.1 |
| 7,234,786 B2 | * | 6/2007 | Mori et al. | 303/191 |
| 2004/0039513 A1 | * | 2/2004 | Knoop et al. | 701/70 |
| 2007/0069578 A1 | * | 3/2007 | Hille et al. | 303/191 |

FOREIGN PATENT DOCUMENTS

| | | |
|---|---|---|
| DE | 8911963 U1 * | 12/1989 |
| DE | 4425578 A1 | 1/1996 |
| DE | 19607048 | 8/1997 |
| DE | 19734567 | 1/1999 |
| DE | 19921478 A1 | 11/2000 |
| DE | 10060498 A1 | 10/2001 |
| DE | 10231555 | 1/2003 |
| DE | 10355219 A1 | 6/2005 |

OTHER PUBLICATIONS

Translation of DE 8911963 U1.*
Translation of DE 8911963 U1, publication date Dec. 1989.*

* cited by examiner

*Primary Examiner*—Thomas J Williams
(74) *Attorney, Agent, or Firm*—Ingrassia Fisher & Lorenz, P.C.

(57) ABSTRACT

The present invention makes an improved braking system available. This comprises a brake pedal and/or a servo unit and also incorporates a hydraulic unit including an integrated electronic controller (for short: EBS) and a hydraulically actuated wheel brake associated with each wheel. Hereby, the wheel brakes are connected hydraulically to the electronic hydraulic unit as is also the brake pedal/servo unit. A brake cylinder for the wheel brake is arranged to be prefilled by means of a "prefill" function in order to at least partly reduce the clearance gap. For the first time hereby, the braking system is provided with a switching device by means of which the "prefill" function is arranged to be switched on or off in dependence on a selectable operating mode. Moreover, the invention proposes a method for electronically regulating the brakes utilizing such a braking system.

13 Claims, No Drawings

BRAKING SYSTEM WITH EBS AND PREFILL FUNCTION AND ELECTRONIC BRAKING CONTROL METHOD

CROSS-REFERENCE TO RELATED APPLICATIONS

This is a continuation of International Application No. PCT/EP2005/006778, filed Jun. 23, 2005, which application claims priority to German Application No. 10 2004 030 464.5, filed Jun. 24, 2004, which are hereby incorporated by reference in their entirety.

TECHNICAL FIELD

The present invention relates to a braking system and more particularly to a braking system utilizing an EBS and a prefill function and a method for electronically regulating the brakes (EBS).

BACKGROUND

So-called conventional braking systems are known in practice. As a general rule, these comprise a brake pedal or a brake pedal/servo unit. Furthermore, the known conventional braking systems comprise a central hydraulic unit including an integrated electronic controller (for short: EBS), whereby the hydraulic unit has a pump in order to build up an active brake pressure independently of the driver in certain cases. Finally, braking systems of this sort have a hydraulically actuated wheel brake, which preferably comprises a brake disk and brake pads, associated with each wheel. Due to the application of the brake pressure produced by the pump, the brake pads surmount a clearance gap and come into contact with the brake disk; the brake "bites" and a braking action can be initiated until the brake is released again.

The wheel brakes and also the brake pedal or the brake pedal/servo unit are hydraulically connected thereby to the electronic hydraulic unit by appropriate hydraulic lines. Wheel revolution sensors detect the rotational speed of the wheels. Steering angle sensors detect the angle to which the steering wheel has been turned. A so-called "sensor cluster" that is frequently arranged in the middle portion of the vehicle floor detects different items of data that are specific to the vehicle, such as the yaw rate or transverse accelerations for example. Hereby, the electronic components are connected together by signal and/or power networks.

Further developments based on conventional braking systems of this sort are also known. In the case of so-called "electrohydraulic brakes" (for short: EHB), the hydraulic connection between the brake pedal and the central hydraulic unit developing the brake pressure is suspended in the normal operational case. Instead, the actuation of the brake pedal is detected electronically, the thus digitized requirement of the driver to decelerate is conveyed over a data line to the central unit of the hydraulic unit and, in dependence on the brake pedal signals, the hydraulic unit is addressed and activated accordingly. Hereby, the hydraulic unit in modern electrohydraulic braking systems of this sort has an additional hydraulic pressure accumulator. In consequence, a brake pressure requested by the driver can be built up abruptly since this pressure is already available in the pressure accumulator and there is no need to wait for the starting of the pump. The brake response times can be pushed down to quasi zero in such EHB systems. The braking distance can be shortened due to the faster build up of the brake pressure. In addition, greater comfort and a more pleasant feeling through the brake pedal can be established since this is no longer subjected to hydraulic feedback, this also being encapsulated in the expression "brake by wire" that is frequently used in EHB systems.

Moreover, electromechanical braking systems (for short: EMB) are also known. The electromechanical brake is the so-called pure form of the "brake by wire" technique. One can then dispense completely with brake fluid and hydraulic hoses. High powered electric motors produce the braking forces directly at the wheels. These are controlled by an electronic control unit. The actuating process is effected by means of an electronic brake pedal incorporating a pedal-feeling simulator and sensors for detecting the driver's requirements However, electromechanical braking systems impose heavy demands on the electrical architecture of the vehicle, and especially on the availability of the on board electrical system and the electrical power supply.

Accordingly, there is a desire to be able to pass on the improvements and additional functionalities known from "brake by wire" systems to conventional braking systems, preferably in combination with the now standardly employed electronic stability programs (for short: ESP), and preferably in an economical manner by means of additional software and sensors should these be necessary. Preferably hereby, the additional functions known for improving active driving safety and comfort known from the EHB system should also be capable of being taken over by the ESP system. However, disadvantages are associated therewith due to the different constructional systems used for conventional and "brake by wire" brakes.

One of these known functions is the so-called "prefill" function. By a "prefill" function, there is meant the prefilling of the wheel brakes at a low pressure before the driver actively operates the brake pedal. This is intended to overcome the clearance gap before a braking action so that the brake pad is already resting on the brake disk prior to the operation of the brake pedal thereby losing less time for the stroke of the brake and thus for the development of an effective braking force during the braking action.

In the case of an electrohydraulic braking system, this "prefill" function is used successfully in series. Hereby, in the event of a rapid or abrupt release of the accelerator pedal, the wheel brake is pre-filled at low pressure for a certain standby period and hence the requisite residual time for applying the pads is pushed down towards zero since an emergency braking action is expected. The standby period for the wheel brake which is prepared for an emergency braking action in this way thereby extends in essence over the time from the abrupt releasing of the accelerator pedal to when the brake pedal is stepped on forcefully. Here, an EHB system takes advantage of the fact that the necessary pressure can be made available by the pressure accumulator and does not need to be produced by a pump. This circumstance is contrary to a simple transfer of the "prefill" function to conventional braking systems since pressure accumulators of this sort are not available therein. This means however that the pump must be activated immediately with the release of the accelerator pedal.

Since an electrohydraulic braking system is in fact a "brake by wire" system, the "prefill" function has no effect upon the feeling through the pedal. Rather however, this is simulated artificially and is freely selectable by taking the "back up" function into consideration. The resultant increase in fuel consumption due to the application of the brake pads to the brake disk does not have an appreciable negative effect due to the normally short length of the time period.

Due to the purely hydraulic connection between the brake actuating means and the wheel brake in a conventional braking system, the "prefill" function does have an effect upon the feeling through the pedal in a conventional braking system. In order to improve the feeling through the pedal when using this function, the brake pressure must be applied to an unlimited extent upon the release of the accelerator pedal in a conventional braking system, this thus leading to disadvantages in terms of fuel consumption and brake wear.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Accordingly, the object of the present invention is to improve a conventional braking system in such a manner that the response time of the wheel brakes can be shortened and the braking distance be reduced whilst avoiding the disadvantages mentioned hereinabove. A further aspect is to improve the feeling through the pedal in a vehicle equipped therewith without fear of an appreciably higher fuel consumption and brake wear. A further aspect of the invention is to provide a method for electronically regulating the brakes that is suited thereto.

Hereby, there is proposed a braking system comprising a brake pedal and/or a brake pedal/servo unit, a hydraulic unit including an integrated electronic controller (for short: EBS) and a hydraulically actuated wheel brake associated with each wheel, wherein the wheel brakes and also the brake pedal or the brake pedal/servo unit are connected hydraulically over corresponding lines to the electronic hydraulic unit by means of which a brake cylinder for the wheel brake is arranged to be prefilled in accord with a "prefill" function in order to at least partly reduce the clearance gap.

It is hereby proposed for the first time that the braking system should further comprise a switching device by means of which the "prefill" function is arranged to be switched on or off in dependence on a selectable operating mode.

Furthermore, there is proposed a method for electronic brake regulation with a braking system comprising a brake pedal and/or servo unit, a hydraulic unit including an integrated electronic controller (for short: EBS) and a hydraulically actuated brake, preferably comprising a brake disk and brake pads, associated with each wheel, wherein the wheel brakes and also the brake pedal/servo unit are connected hydraulically to the electronic hydraulic unit by means of which a brake cylinder for the wheel brake is prefilled in accord with a "prefill" function in order to reduce the clearance gap.

It is hereby proposed for the first time that the "prefill" function can be switched on or off, preferably automatically, in dependence on a selectable operating mode.

By virtue of a selectable or purposeful activation of the "prefill" function in certain applications, the interrelationship between a) an improved feeling through the pedal and the increased fuel consumption associated therewith for a slightly increased friction moment of the brake in the case of brake pads resting on the disk with virtually no residual clearance gap and b) a low residual friction moment that is relevant for consumption measurements, can be resolved, whereby the feeling through the pedal corresponds to the state of the art.

The wheel brakes can be further optimized in regard to the residual friction moments thereof for the purposes of reducing consumption, and the effect upon the feeling through the pedal can be eliminated or activated in the one or the other switching position.

Consequently, the advantages of the "prefill" known from the electrohydraulic braking system are also available in advantageous manner to conventional braking systems without fear thereby of any disadvantages as has been the case until now.

Hereby, the utilization of the "prefill" function can be disconnected or activated by an appropriate, preferably automatically regulated, connection or disconnection process, for example, by means of the comfort and/or sport switch. In a first position, the comfort position for example, the function either remains completely switched off and is only brought into action automatically should full braking be expected, or, the pre-filling is effected at an appropriately low pressure without the friction moment of the wheel brake thereby being increased. In advantageous manner hereby, the clearance gap is merely reduced to an extent such that there will be no effect on the fuel consumption. It is solely in the case of a rapid release of the accelerator pedal that the wheel brake is completely pre-filled in order to further reduce the response time of the brakes and thus additionally further shorten the braking distance.

In this way, it is ensured that the "prefill" function is available to a limited extent for emergencies in the comfort position of the selector switch, i.e. in the event of an abrupt release of the accelerator pedal and subsequent violent operation of the brake, the time interval that the driver needs to lift his foot from the accelerator pedal and place it on the brake pedal has already been bridged or utilised for the process of completely pre-filling the wheel brake so that the wheel brakes are then in a more rapidly responsive state when the brake pedal is depressed.

Moreover, it is ensured that, when in the comfort position, the "prefill" function is not activated when the accelerator pedal is lifted off or released in the normal way and/or the brake pedal is lightly depressed so that no increase whatsoever in consumption can occur due to a possibly premature increase in the brake friction moment and also no additional wear of the brakes need be feared. In addition thereby, maximum running comfort is maintained whilst the vehicle is gently merging or when the intention is to go with the flow in a stream of traffic.

In contrast thereto, the "prefill" function can be permanently connected in a second position, for example, the so-called sports position. Hereby, the pressure can additionally be selectively increased, preferably automatically, in an appropriate manner. It is thereby ensured that the brakes can immediately provide a fast-acting response whenever the brakes are applied so that sporty driving is also supported by the brake pedal characteristic.

Due to the selectable disconnection or activation of the "prefill" function, the advantages of this "prefill" function can be used without having to simultaneously accept the disadvantages thereof that are known from the state of the art.

In the comfort position in which, for example, rolling trials for consumption measurement purposes or the like are accomplished in the field, the residual friction moments of the brake are not increased relative to those of a released brake since the "prefill" function is not yet active or, although active, has not yet built up the pressure to the extent that a brake pad would already be resting on the brake disk. In the sports function by contrast, the "prefill" function is switched on and the pressure is possibly additionally increased in such a manner that—apart from an improved feeling through the pedal which then feels "harder" or "crisper" so to speak—the brakes can be adjusted to bite as quickly as possible due to the elimination of the clearance gap to the point where the brake disks touch the brake pads. In accord with the switching positions selected by the driver or established automatically by the system, the brake pedal then has a different braking characteristic. The utilization of the "prefill" function when the accelerator pedal is rapidly released within a time window is thereby independent of the switching position and hence is applicable automatically without being influenced by the driver.

Advantageous further developments of the invention are apparent from the features of the subordinate Claims.

Thus, in a preferred embodiment of the method, provision is made for a comfort or a sport mode to be selected as the operating mode. Furthermore, a so-called consumption-optimized mode or a long-distance mode could also be set. Hereby, the pressures in the wheel brake cylinder that are generatable by the braking system can be preselected or set, possibly fully automatically, in dependence on the application and the selected mode in such a manner that the clearance gap is reduced on the one hand whereas, on the other hand, it is not reduced to such an extent that it would reach zero, but rather, such that a very small residual clearance gap remains between the brake pad and the disk. Hereby, this is set in such a way that, from a time window point of view, the remaining stroke of the brake which still has to be made corresponds to the amount of time which an average driver needs in order to lift his foot from the accelerator pedal and place it on the brake. There is thus provided a braking system which is immediately operational for emergency braking in all circumstances. Delays in the response time are reduced and braking distances are minimized.

In another preferred embodiment of the method, provision is made for the "prefill" function to be activatable for a limited period of time. This has the advantage that the pumping performance of the hydraulic unit which is only partly available for a limited period of time in conventional braking systems is not demanded over too long a period so that the possibility of overloading such a conventional hydraulic unit can be advantageously excluded. An acceptable compromise between the availability of a "prefill" function and the maximum stress on the hydraulic pump can thereby be achieved.

In accord with a further preferred embodiment, provision is made for the brake cylinder to be pre-fillable at an initial brake pressure which is lower than the brake pressure that is necessary for the execution of a braking action. This thus ensures that the brake pad does not yet rest fully on the brake disk, but nevertheless a clearance gap has already been surmounted. In this way, the brake is at maximum readiness for a braking action but, at the same time, unwanted brake wear is still prevented. This helps to increase safety on the one hand and to keep the operating costs within minimal bounds on the other.

In a further preferred embodiment, provision is made for the pre-filled pressure applied to the wheel brake by the "prefill" function to adjust the clearance gap between the brake disk and the brake pad to virtually zero, and preferably to build up a very weak pressure on the brake disk. This ensures e.g. in a sports mode, that the in any case somewhat sportier or brisker driving style which frequently also demands more violent braking then also encounters a suitably activated or braking-ready brake.

In accord with a further preferred embodiment, provision is made for the brake regulation to be part of a regulation of the dynamics of vehicle movement incorporating an electronic stability program (for short: ESP). This thus allows the advantages known from the ESP system to be used in a synergic manner with a conventional brake which is advantageously improved by the "prefill" function, so that yet further advantages accrue from the interaction. The brake regulation may also be part of an integrated chassis regulation (for short: ICC).

This thereby prevents in advantageous manner a direct hydraulic passage having a negative influence on the feeling through the pedal during a process of optimizing the braking system in regard to residual friction moments. The triggering of the "prefill" function can occur upon the release of the accelerator pedal. This is thereby oriented on a time window which is sufficient to build up a friction moment of the brake, but does not yet lead to increased consumption due to the temporal delimitation, and at the same time does not make excessive demands on the conventional ESP pumping effect that is limited by the duration in time of the activation process.

Thus, in the "comfort" switching position, provision is made for the "prefill" function to be switched on only when there is a rapid release but for it otherwise to remain switched off. This has the advantage of shortening the braking distance and also of a small residual friction moment of the brake at the exact moment when it happens, so that no additional consumption can be detected. Normal consumption measurements are carried out in this switching position. By contrast, the "prefill" function can always be switched on i.e. be permanently connected in the "sport" switching position, i.e. in the event of a normal release as well, and not just in the case of the accelerator pedal being rapidly released. Apart from the shortening of the braking distance, this also provides an improvement in that feeling through the pedal that is considered to be sporty, whereby an increased consumption of fuel is accepted when activating the "sport" switching position.

For the first time thereby, the invention discussed hereinabove creates an improved conventional braking system comprising a brake pedal and/or a servo unit, a hydraulic unit including an integrated electronic controller (for short: EBS) and a hydraulically actuated wheel brake, preferably comprising a brake disk and brake pads, associated with each wheel. Hereby, the wheel brakes and also the brake pedal/servo unit are connected hydraulically to the electronic hydraulic unit. With the aid thereof, a brake cylinder for the wheel brake is adapted to be pre-filled in accord with a "prefill" function in order to at least partly reduce the clearance gap. Furthermore for the first time hereby, the braking system is to comprise a switching device by means of which the "prefill" function is adapted to be switched on or off in dependence on a selectable operating mode. Moreover, the invention discussed hereinabove proposes a method for electronically regulating the brakes utilizing such a braking system.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A braking system for a vehicle comprising:
a brake pedal/servo unit;

a hydraulic unit including an integrated electronic controller; and a hydraulically actuated wheel brake comprising a brake cylinder, a brake disk and a brake pad associated with each wheel, wherein the wheel brakes and also the brake pedal/servo unit are connected hydraulically to the electronic hydraulic unit;

wherein the integrated electronic controller is configured to execute a prefill function that prefills the brake cylinder without regard to a position of an accelerator pedal associated with the vehicle and thereby at least partly reduces a clearance gap between the brake pad and the brake disk in a first operating mode but not in a second operating mode, wherein the first and second operating modes are switchably selected by a driver of the vehicle.

2. The braking system of claim 1 wherein the integrated electronic controller is further configured to execute the prefill function in the second operating mode in response to the detection of an emergency maneuver.

3. The braking system of claim 2 wherein the emergency maneuver is an abrupt release of an accelerator pedal.

4. The braking system of claim 2 wherein the emergency maneuver is a violent operation of the brake pedal.

5. The braking system of claim 1 wherein the first and second operating modes correspond to a sport mode and a comfort mode of the vehicle, respectively.

6. The braking system of claim 1 wherein the clearance gap is reduced in the first operating mode before a driver actively operates a brake pedal.

7. A method of operating a braking system in a vehicle having a brake pedal, an accelerator pedal and a switching device configured to be operated by a driver of the vehicle, wherein the braking system comprises a hydraulically-actuated brake cylinder, a brake disk and a brake pad associated with each wheel of the vehicle, and wherein the brake disk and brake pad are initially separated from each other by a clearance gap, the method comprising the steps of:

maintaining the clearance gap between the brake disk and the brake pad at a first distance during a first operating mode of the vehicle;

in response to a signal received from the switching device to place the vehicle in a second operating mode different from the first operating mode, directing the partial filling of the hydraulically-actuated brake cylinder to thereby reduce the clearance gap between the brake disk and the brake pad to a second distance that is shorter than the first distance, wherein the directing occurs without regard to a position of the accelerator pedal; and subsequently closing the clearance gap between the brake disk and the brake pad in response to the driver actively operating the brake pedal to thereby slow the vehicle.

8. The method of claim 7 further comprising the step of subsequently controlling the hydraulically-actuated brake cylinder to increase the clearance gap from the second distance to the first distance when the vehicle is switched from the second operating mode to the first operating mode.

9. The method of claim 8 wherein the controlling step occurs after a predetermined period of time.

10. The method of claim 8 wherein the controlling step occurs in response to a second signal received from the switching device.

11. The method of claim 7 wherein the partially filling comprises adjusting the clearance gap between the brake disk and the brake pad to substantially zero.

12. The method of claim 7 wherein the method is executed by an integrated electronic controller associated with a hydraulic unit that is hydraulically coupled to the brake cylinder and to the brake pedal.

13. The method of claim 7 wherein the vehicle is not substantially slowed prior to the step of subsequently closing the clearance gap between the brake disk and the brake pad.

* * * * *